(12) United States Patent
Mazza

(10) Patent No.: US 12,060,711 B2
(45) Date of Patent: Aug. 13, 2024

(54) EXTRUDED PROFILE

(71) Applicant: Ema Cerloj, Durazzo (AL)

(72) Inventor: Gabriele Mazza, Durazzo (AL)

(73) Assignee: Ema Cerloj, Durazzo (AL)

( * ) Notice: Subject to any disclaimer, the term of this patent is extended or adjusted under 35 U.S.C. 154(b) by 441 days.

(21) Appl. No.: 17/420,765

(22) PCT Filed: Dec. 20, 2019

(86) PCT No.: PCT/IB2019/061212
§ 371 (c)(1),
(2) Date: Jul. 6, 2021

(87) PCT Pub. No.: WO2020/144523
PCT Pub. Date: Jul. 16, 2020

(65) Prior Publication Data
US 2022/0112717 A1 Apr. 14, 2022

(30) Foreign Application Priority Data

Jan. 7, 2019 (IT) .......................... 102019000000127

(51) Int. Cl.
*E04C 3/06* (2006.01)
*E04B 1/58* (2006.01)
(Continued)

(52) U.S. Cl.
CPC .................. *E04C 3/06* (2013.01); *E04C 3/28* (2013.01); *E04B 1/5825* (2013.01); *E04C 2003/0478* (2013.01)

(58) Field of Classification Search
CPC ...... E04C 3/06; E04C 3/28; E04C 2003/0478; F16B 7/187; F16B 12/32; E04B 1/5806; E04B 2/7854; Y10T 403/341
See application file for complete search history.

(56) References Cited

U.S. PATENT DOCUMENTS 4,065,904 A * 1/1978 Taylor .................. E04B 2/7854
                                                                248/245
4,455,103 A * 6/1984 Hackenberg .......... F16B 7/0473
                                                                403/217
(Continued)

FOREIGN PATENT DOCUMENTS

CN     201386480     1/2010
CN     102518930     6/2012
(Continued)

OTHER PUBLICATIONS

Italian Search Report issued for corresponding Italian Patent Application No. 102019000000127, completed on Jul. 2008, two pages.
(Continued)

*Primary Examiner* — Gisele D Ford
(74) *Attorney, Agent, or Firm* — Vorys, Sater, Seymour and Pease LLP

(57) ABSTRACT

An extruded profile defining a normal section surface, a horizontal loading direction along the normal section surface and a vertical loading direction along the normal section surface perpendicular to the horizontal loading direction The profile includes a core arranged in a central position at the intersection of the directions, a plurality of arms each including a radial segment radially connected to the core and a tangential segment perpendicularly connected to the radial segment The radial segments of the adjacent arms are perpendicular to each other and each oriented 45° to the horizontal load direction and/or the vertical load direction, and the tangential segments of the adjacent arms are configured to simultaneously support the same load along the horizontal load direction and/or the vertical load direction.

13 Claims, 10 Drawing Sheets

(51) Int. Cl.
*E04C 3/04* (2006.01)
*E04C 3/28* (2006.01)

(56) References Cited

U.S. PATENT DOCUMENTS

| | | | | |
|---|---|---|---|---|
| 4,458,455 A * | 7/1984 | Tollstoff de Voss | ...... | E01F 9/65 D8/382 |
| 4,544,300 A * | 10/1985 | Lew | ........................ | F16B 12/46 D25/120 |
| 4,583,359 A * | 4/1986 | Staeger | ................. | E04B 2/7845 403/255 |
| 5,173,001 A * | 12/1992 | Schunke | ............... | F16B 37/045 403/255 |
| 5,263,296 A * | 11/1993 | Spera | ..................... | E04G 11/48 52/646 |
| 5,265,972 A * | 11/1993 | Bahr | ........................ | F16B 12/50 403/252 |
| 5,429,438 A * | 7/1995 | Wood | ........................ | F16C 29/02 384/42 |
| 5,647,650 A * | 7/1997 | Daugherty | ............. | A47B 67/04 312/265.5 |
| 5,651,630 A * | 7/1997 | Nomura | .................. | F16B 7/187 403/219 |
| 5,746,535 A * | 5/1998 | Kohler | ................. | F16B 37/046 403/258 |
| 6,485,178 B1 * | 11/2002 | Koban | .................... | F16C 29/12 384/42 |
| 6,682,255 B2 * | 1/2004 | Battaglia | .................. | A47F 5/14 403/381 |
| 6,712,543 B1 * | 3/2004 | Schmalzhofer | ......... | F16B 7/187 403/258 |
| 6,764,245 B2 * | 7/2004 | Popovski | .............. | F16B 7/0466 403/374.2 |
| 7,073,943 B2 * | 7/2006 | Schmalzhofer | .......... | B23Q 1/58 384/42 |
| 8,065,847 B2 * | 11/2011 | Gimpel | .............. | A47B 96/1466 52/645 |
| 8,888,397 B2 * | 11/2014 | Oetlinger | ................. | F16B 7/18 403/199 |
| 8,992,110 B2 * | 3/2015 | Decroos | .................... | A47F 5/10 403/292 |
| 9,797,426 B2 | 10/2017 | Flaig | | |
| 10,662,650 B2 * | 5/2020 | Lacroix | ..................... | E04C 3/06 |
| 2002/0037195 A1 * | 3/2002 | Ajiki | ....................... | F16B 7/187 403/403 |
| 2002/0054787 A1 * | 5/2002 | Kahl | ....................... | F16B 7/187 403/403 |
| 2002/0110408 A1 * | 8/2002 | Battaglia | ................... | A47F 5/14 403/170 |
| 2003/0036314 A1 * | 2/2003 | Schmalzhofer | ......... | F16B 7/187 439/680 |
| 2003/0039507 A1 * | 2/2003 | Liu | .......................... | F16B 7/00 403/217 |
| 2004/0033103 A1 * | 2/2004 | Ludwig | ................... | F16B 7/187 403/188 |
| 2004/0096129 A1 * | 5/2004 | Schmalzhofer | .......... | B23Q 1/58 384/42 |
| 2005/0260032 A1 * | 11/2005 | Band | ...................... | F16B 7/187 403/252 |
| 2006/0078371 A1 * | 4/2006 | Holscher | ................. | F16B 7/187 403/264 |
| 2006/0110215 A1 * | 5/2006 | Holscher | ................. | F16B 7/187 403/1 |
| 2006/0115321 A1 * | 6/2006 | Maffeis | ...................... | E04C 3/06 403/253 |
| 2006/0236640 A1 * | 10/2006 | Hung | ...................... | F16B 7/187 52/781.3 |
| 2007/0283630 A1 * | 12/2007 | Kasdorf | .................. | E04B 2/744 52/36.1 |
| 2011/0262223 A1 * | 10/2011 | Oetlinger | ............... | E05D 5/0238 403/376 |
| 2015/0010343 A1 * | 1/2015 | Flaig | ..................... | F16B 7/0433 29/525.01 |
| 2015/0211560 A1 * | 7/2015 | Rixen | ..................... | F16B 7/048 403/188 |
| 2017/0051770 A1 * | 2/2017 | Flaig | ..................... | F16B 7/187 |
| 2017/0241459 A1 * | 8/2017 | Flaig | ..................... | F16B 7/187 |
| 2018/0283426 A1 * | 10/2018 | Oetlinger | ................ | F16B 12/02 |
| 2019/0003500 A1 * | 1/2019 | Oetlinger | ............... | F16B 5/0241 |
| 2019/0127978 A1 * | 5/2019 | Lacroix | ..................... | E04C 3/06 |
| 2019/0218778 A1 * | 7/2019 | Jiang | ........................ | E04C 3/09 |
| 2020/0392975 A1 * | 12/2020 | Meyer | .................... | F16B 37/045 |

FOREIGN PATENT DOCUMENTS

| | | |
|---|---|---|
| DE | 9200645 U1 | 4/1992 |
| DE | 102008006439 | 7/2009 |
| EP | 0716193 A1 | 6/1996 |
| EP | 1149957 | 10/2001 |
| WO | 2005111328 A1 | 11/2005 |

OTHER PUBLICATIONS

International Search Report and Written Opinion, mailed Mar. 4, 2020.

* cited by examiner

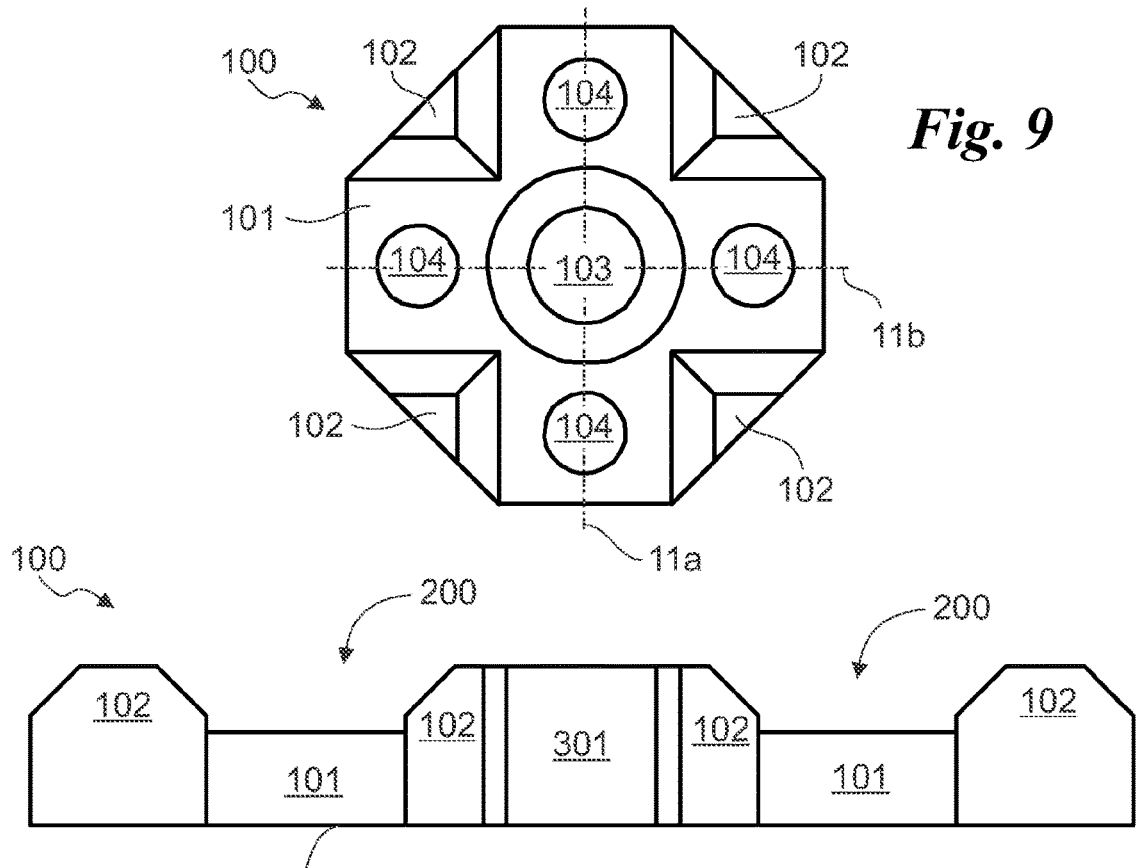
Fig. 9
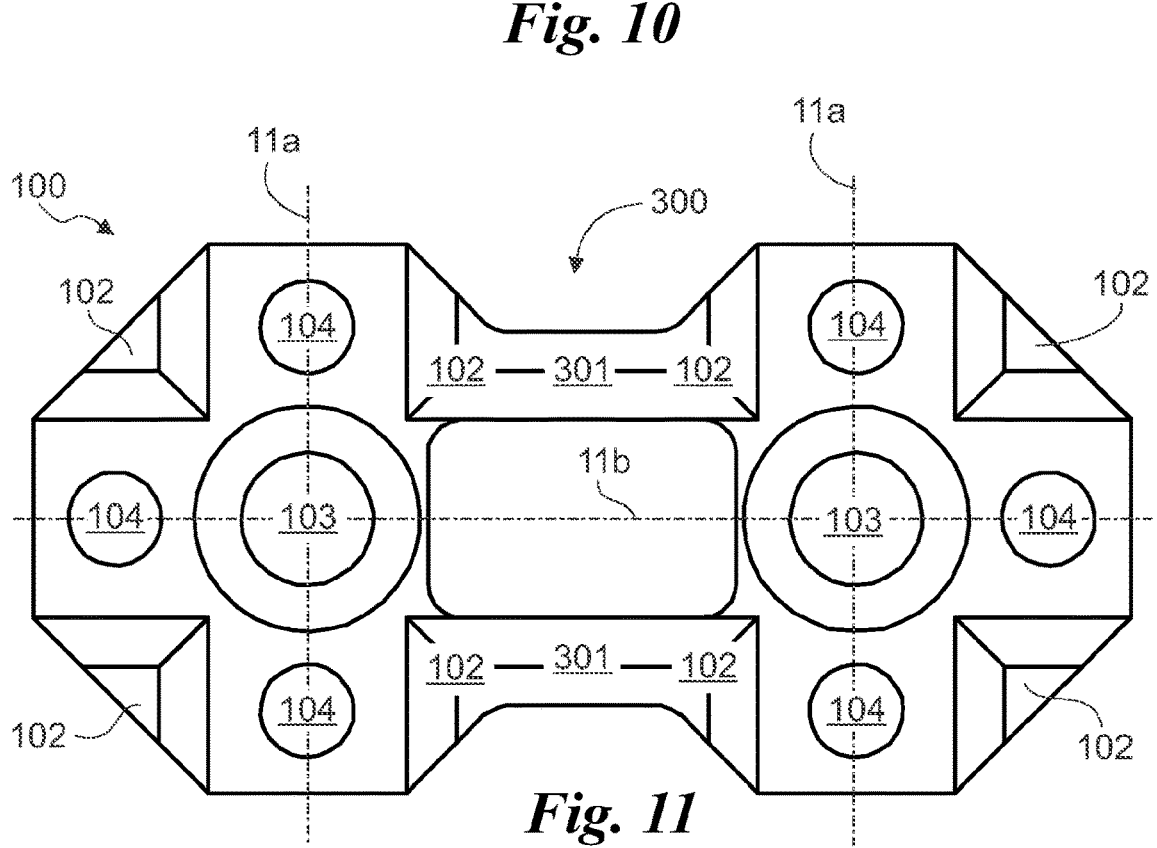
Fig. 10
Fig. 11

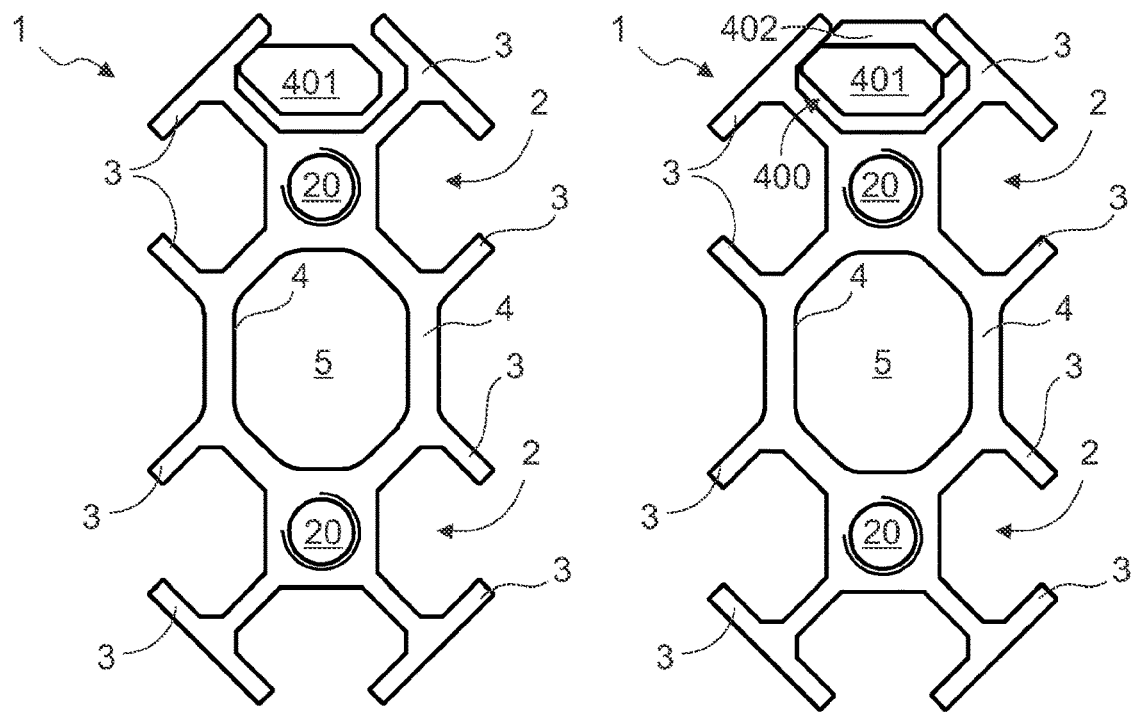
*Fig. 22a*      *Fig. 22b*
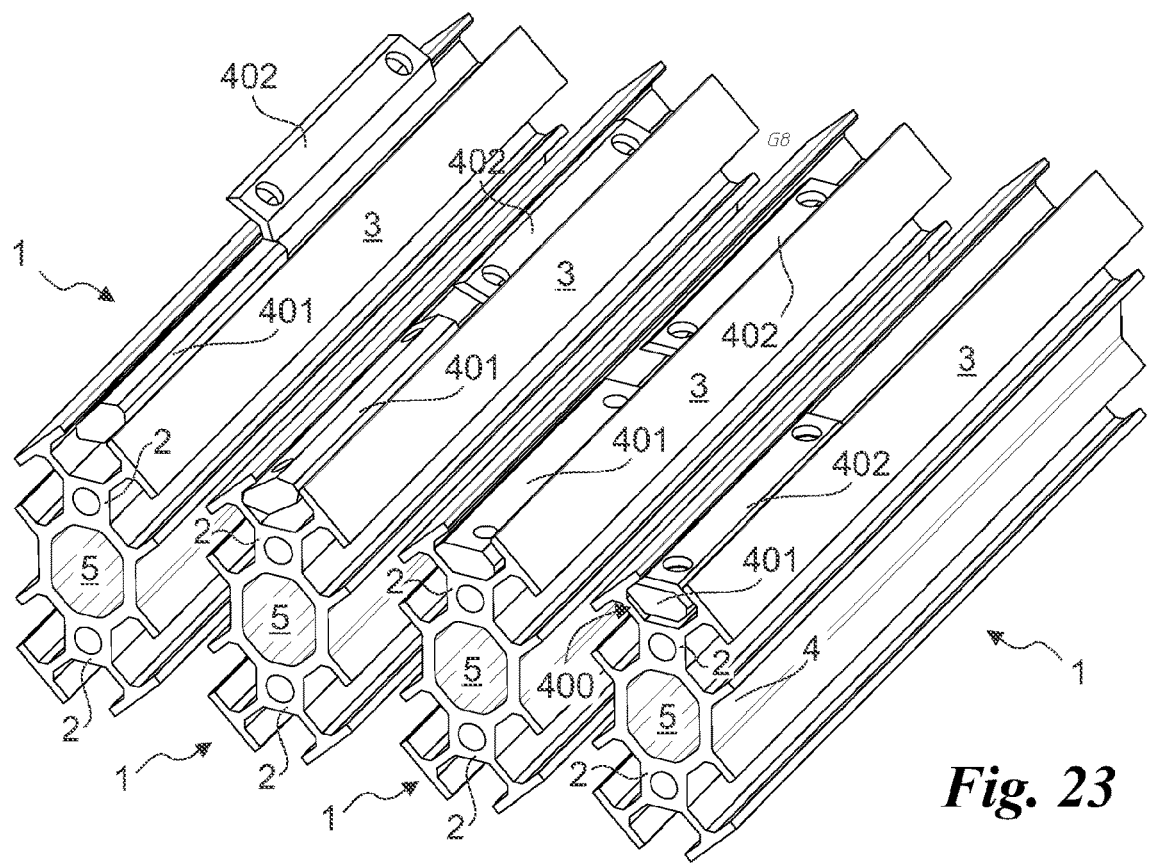
*Fig. 23*

EXTRUDED PROFILE

The present invention relates to an extruded profile of the type as recited in the preamble of the first claim.

In particular, the present invention relates to an extruded profile of the type suitable for use in the construction of frames or modular structures in which a plurality of extruded profiles are positioned and connected in an ordinate manner.

As known, extrusion is an industrial production process of plastic deformation allowing the production of objects with a constant cross-section, such as pipes, bars, sections and sheets. It is used for metal materials, such as steel, aluminium, lead or copper, plastics, such as rubber or thermoplastics, and in general for materials with a high degree of plasticity.

Among the products usually made with this technology are extruded profiles.

The latter are substantially long elements, in which one dimension prevails over the other two, such as a bar, with a profile that can be of any shape. For example, extruded profiles can be simply L or T-shaped or have much more complex shapes. Profiles of this type can be used to make frames for window frames or other frames predisposed for the construction of structures subject to loads or otherwise.

Generally, extruded profiles used for structural purposes have a basic quadrangular shape, typically describing a square perimeter.

An example of this type is the profile described in U.S. Pat. No. 9,797,426 and DE-A-102008006439.

Other types of extruded profiles with different geometries are also known, e.g. hexagonal or octagonal, as described in patent applications CN-Y-201386480 and CN-A-102518930, or intersecting, for example in the patent application EP-A-1149957.

The prior art described has several significant drawbacks.

In particular, the solutions outlined define structurally complicated, complex profiles that require conventional locking elements.

In particular, in order to create load-bearing structures, specially designed interface elements are required, depending on the direction and type of junction.

In addition, the locking nuts, which are usually inserted by sliding into the lateral interstices, must be inserted beforehand as none of the profiles described allows insertion after the profile has been closed at the ends, for example with interface portions.

A more convenient solution is described in the patent application EP-A-0716193.

The extruded profile has a cross section wherein the arms include T-shaped elements with side chamfers.

These latter elements are more fragile structural portions which, however, allow the connection with arrow interface elements made ad hoc.

This profile also has significant drawbacks.

First of all, as with the other profiles, the nuts must be inserted in advance inside the section defined by the profile.

Moreover, in this case also, the interface elements must be modified and made differently depending on the type of connection desired, for example in the case in which the interface element is the junction of a structure where three or four bars meet, compared to an angular joint.

The profile itself, although of different shape, works by compression like all conventional profiles and, therefore, is always normally coupled to the other profiles. In this situation the technical purpose of the present invention is to devise an extruded profile able to substantially overcome at least some of the drawbacks mentioned.

Within the sphere of said technical purpose one important aim of the invention is to obtain an extruded profile that allows different types of couplings to be made, compared to known profiles, in such a way as to distribute the loads in a different way.

Another important aim of the invention is to create a profile that allows the coupling nuts to be inserted even when the extruded profile is connected to the ends and it is no longer possible to fit the sliding nuts inside the side slots of the profile.

The technical purpose and specified aims are achieved by an extruded profile as claimed in the appended claim 1.

Preferred technical embodiments are described in the dependent claims.

The characteristics and advantages of the invention are clearly evident from the following detailed description of preferred embodiments thereof, with reference to the accompanying drawings, in which:

FIG. 9 shows a front view of a joining device for extruded profiles according to the invention in a first embodiment example;

FIG. 10 shows a side view of a joining device for extruded profiles according to the invention in a second embodiment example for double core profiles;

FIG. 11 is a front view of the joining device for extruded profiles in FIG. 10;

FIG. 22a shows a front view of an extruded profile according to the invention in which the locking base of a nut that can be disassembled according to the invention is inserted;

FIG. 22b is a front view of an extruded profile according to the invention in which the clamping base and the clamping cover of a nut that can be disassembled according to the invention is inserted; and FIG. 23 represents an insertion sequence inside a profile according to the invention of a nut that can be disassembled according to the invention.

Figure 1:
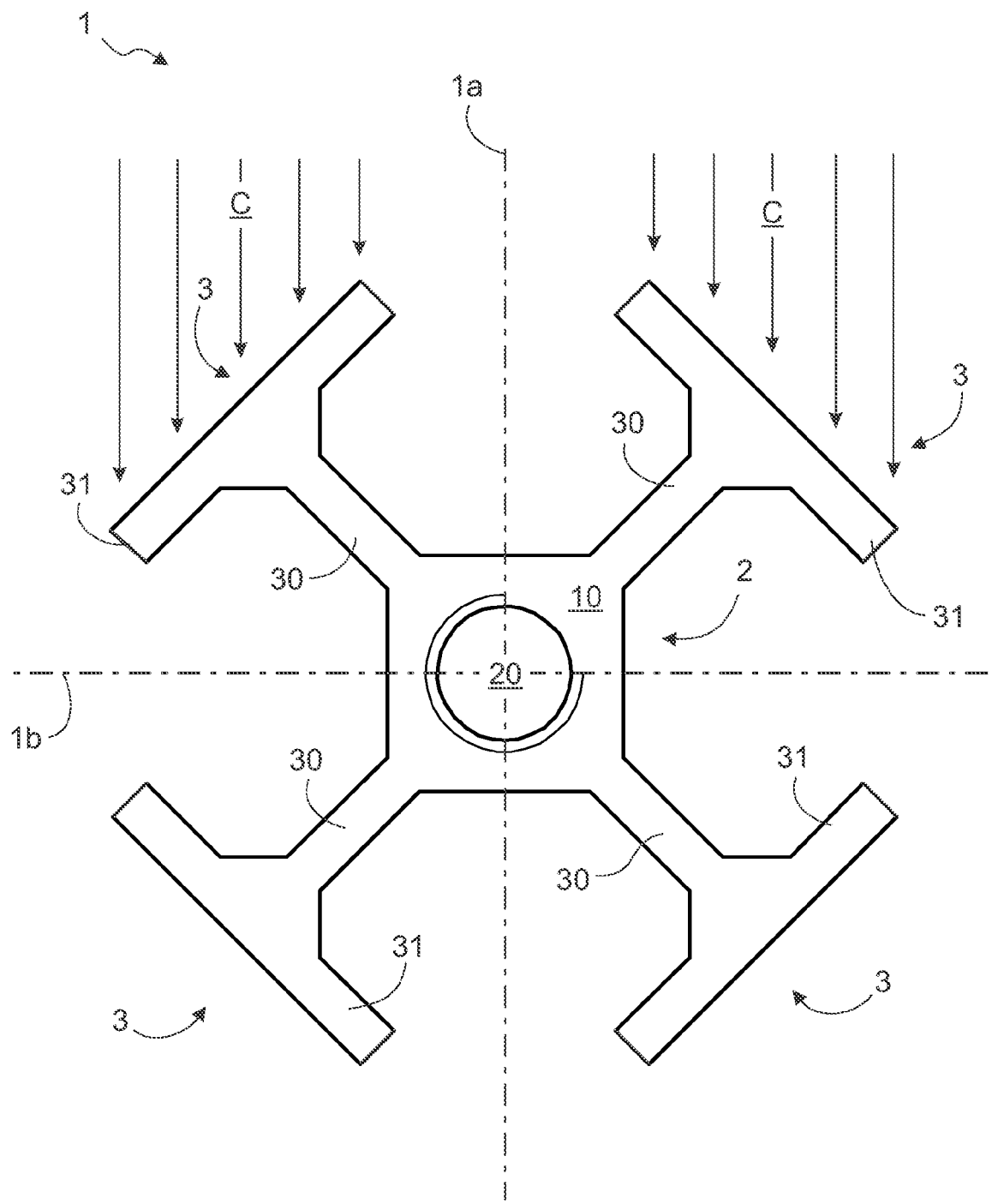
FIG. 1 shows a front view of an extruded profile according to the invention.

In the present document, the measures, values, shapes, and geometric references (such as perpendicularity and parallelism), when associated with words like "about" or other similar terms such as "approximately" or "substantially", are to be understood as except for measurement errors or inaccuracies owing to production and/or manufacturing errors and, above all, except for a slight divergence from the value, measure, shape, or geometric reference with which it is associated. For example, said terms, if associated with a value, preferably indicate a divergence of not more than 10% of said value.

In addition, where used terms such as "first", "second", "upper", "lower", "main" and "secondary" do not necessarily refer to an order, a priority relationship or relative position, but may simply be used to more clearly distinguish different components from each other.

The measurements and data presented herein are to be considered, unless otherwise indicated, as made in Standard International Atmospheres ICAO (ISO 2533: 1975).

With reference to the Drawings, reference numeral 1 globally denotes the extruded profile according to the invention.

The profile 1 is preferably suitable for the construction of real structural bars and/or frames, for example comprising a plurality of structural bars and/or frames. The structural bars may, for example, provide for the assembly of the profile 1 with joining means for extruded profiles. Such joining means may be of any type, for example conventional, or of the type described in the patent application EP-A-0716193, incorporated herein for reference, in column 2 lines 12-20, column 4 lines 32-52 and in FIGS. 1A-1G.

Preferably, however, the profile 1 is suitable to be coupled to a joining device for extruded profiles 100, as described below.

The profile 1 preferably defines a surface with a normal section 10.

The normal section surface 10 is therefore preferably the area described by the profile 1. The extruded profile 1 is substantially a beam having a prevailing extension axis and the sections of which, normal to the prevailing extension axis, identify said profile or, in particular, the normal section surface 10.

The prevailing extension axis may be straight or curved.

Substantially, the profile 1 creates the beam when extruded along its prevailing extension axis. Of course, the term extruded profile 1 is understood to means that the profile is geometrically extruded, it is therefore a profile, and the term extrusion has, in this meaning, no reference to the type of processing. As is known, extruded profiles 1 of this type are, however, commonly obtained by industrial extrusion methods or by other methods such as, for example, pultrusion or yet others.

The profile 1 defines then a horizontal load direction 1a and a vertical load direction 1b.

The horizontal 1a and vertical load directions 1b create with the prevailing extension axis a substantially ordered triple. In particular, the three directions may identify the barycentric axes of the extruded profile 1, or at least part of it. In addition, the load directions 1a, 1b preferably define the directions along which, in use, the stresses to which the extruded profile is subjected in the plane defined by the normal section surface 10 lie.

Obviously, this does not rule out that the extruded profile 1 may be subject, in use, to other loads such as, for example, typically eulerian normal loads, i.e. tip loads oriented integrally with the prevailing extension axis, or other loads.

The loads themselves, in turn, may subject the entire extruded profile 1, or the structural bar made with it, to derived stresses, e.g. flexural stresses, or others yet. In any case, preferably the horizontal load direction 1a lies along the normal section surface 10 and the vertical load direction 1b lies along the normal section surface 10 perpendicular to the horizontal load direction 1a.

The profile 1 is therefore described below in two-dimensional terms, i.e. referring to what is defined along the plane of the normal section surface 10.

The profile 1 preferably includes a core 2 and a plurality of arms 3.

The core 2 is arranged in a central position at the intersection of the directions 1a, 1b. Substantially, it defines the centre or fulcrum of the profile 1.

The core 2 may be of various shapes and sizes. Preferably, the core 2 is a regular shape, for example substantially square.

The term "substantially", referring to geometric shapes, hereinafter shall be taken to mean that the shape is not strictly and precisely as described, but that it defines roughly a similar shape. This, therefore, does not prevent the corners from being rounded or the sides from, for example, presenting curved, slightly curved or serrated portions.

When the core 2 is square shaped, preferably, the arms 3 are connected to the core 2 starting from at least part of the vertices of the square shape. Even more preferably, but not necessarily, the arms 3 are four in number and each connected to a vertex of the square in such a way as to complete all the vertices.

The core 2 may also comprise a connection hole 20.

As in most profiles of the prior art, the connection hole 20 is preferably arranged at the centre of the profile 1 and, therefore, at the meeting point of the load axes 1a, 1b.

In any case, the connection hole 20 is preferably suitable to allow the connection with other elements. For example, the connection hole 20 is, in particular, suitable to allow the connection of the profile 1 and of the device 100 in such a way as to create a structural bar.

The connection hole 20 preferably includes internal threaded portions so that at least one screw can be trapped.

The core 2 may, therefore, be in one piece with the arms 3, and preferably it is, or it can be separate from them, as long as it can be conveniently attached to them, so that the profile 1 can be easily created.

Each of the arms 3 preferably includes a radial segment 30 and a tangential segment 31.

The radial segment 30 is preferably a section of the normal section surface 10 extending along a prevailing direction of its own, for example straight and possibly curved. The radial segment 30 is also radially connected to the core 2.

As mentioned above, the radial segment 30 can be connected in specific points of the core 2 if the core is a regular shape, for example square.

The tangential segment 31 is, instead, preferably connected perpendicularly to the radial segment 30. More in detail, preferably, the tangential segment 31 is connected to the free end of the radial segment 30.

The tangential segment 31, like the radial segment 30 is preferably a section of the normal section surface 10 extending along a prevailing direction of its own, for example straight, and possibly curved.

It may therefore be the same size as the radial segment 30, or it may also be different lengths.

In addition, the tangential segment 31 can be connected to the radial segment 30 at a midpoint thereof, for example the midpoint creating a substantially T-shape especially if segments 30, 31 are straight, or at an end.

The segments 30, 31 can also be in one piece or can be connectable to make the arms 3.

In addition, the segments 30, 31 may have a regular or substantially rectangular shape, as shown in FIG. 1 and FIGS. 6-8, or they may have substantially pointed ends, for example at right angles, as shown in FIGS. 2-5. Preferably, the segments 30, 31 are rectangular in shape.

The shape of the substantially rectangular segments 30, 31 should not be understood in the literal restrictive sense, but may be taken to mean a predominantly rectangular shape in which, however, some edges may also be chamfered or rounded.

In addition, between the segments 30, 31, there may also be more or less extended and triangular profile connections, as shown for example in FIG. 1, or partially curved profiles.

In profile 1, the radial segments 30 of the adjacent arms 3 are preferably perpendicular to each other. The adjacent arms 3 are the arms 3 arranged adjacent or proximal to each other around the core 2.

For the purposes of the inventive concept it is sufficient that at least part of the arms 3 have the above characteristic, but not all the adjacent arms 3 need to be absolutely perpendicular to each other. For example, in an embodiment described subsequently and shown in FIG. 5 wherein the core 2 is substantially square and the arms 3 are three in number, the two facing arms, which could potentially be considered adjacent in the absence of the fourth arm 3, need not be and are not perpendicular to each other.

In other words, the adjacent arms 3 are the arms 3 that can be reasonably considered, in a structural sense, as the actually contiguous and subsequent arms 3.

In addition, the radial segments 30 are preferably each oriented at 45° with respect to the horizontal load direction 1a and/or the vertical load direction 1b.

Consequently, preferably, the tangential segments 31 of the adjacent arms 3 are configured to simultaneously support the same load C along the horizontal load direction 1a and/or the vertical load direction 1b.

The load C is preferably a single load oriented along the horizontal load direction 1a and/or the vertical load direction 1b. A load C could consist, for example, of a device 100 resting on the tangential segments 31 or an internal structural bar resting on segments 31 of the profile, as shown in FIGS. 16-21.

In any case, preferably, the tangential segments 31 distribute the stress resulting from the load C preferably tangentially or, in structural terms, shear.

Within the scope of the same inventive concept, the profile 1 can be made in different forms.

In a first embodiment, shown in FIG. 1, the profile 1 preferably comprises a core 2 and four arms 3. In addition, preferably, each of the arms 3 creates a T-structure by means of the radial 30 and tangential 31 segments.

In detail, preferably, in this configuration all the radial 30 and tangential 31 segments are straight and the tangential segments 31 are connected to the radial segments 30 at their midpoint.

In particular, in addition, the profile 1 preferably creates a normal section surface 10 the perimeter of which is substantially octagonal and defined by alternate tangential 31 and empty segments. Each empty segment is, preferably, identified by the rectilinear conjunction of two ends respectively facing each other of adjacent tangential segments 31.

The adjacent arms 3 and the portion of the core 2 between the adjacent arms 3, i.e. included therein, thus preferably define a substantially octagonal shape accessible at the empty segment defined between the arms 3.

In other embodiments, the profile 1 may also comprise a plurality of cores 2.

If the number of cores 2 is greater than one, the profile 1 preferably also comprises junction elements 4.

The junction elements 4 preferably connect two separate arms 3 each connected to a separate core 2. In particular, moreover, the junction elements 4 connect the arms 3 starting from their respective ends spaced from the cores 2.

For example, the junction elements 4 can be portions of normal section surface 10 extending along their own prevailing direction, for example straight and possibly curved.

They can therefore be connected at the ends to the mutually connected arms 3 and, in particular, they can therefore be connected to an end of the radial 30, and also tangential segments 31, of the arms 3.

Figure 2:
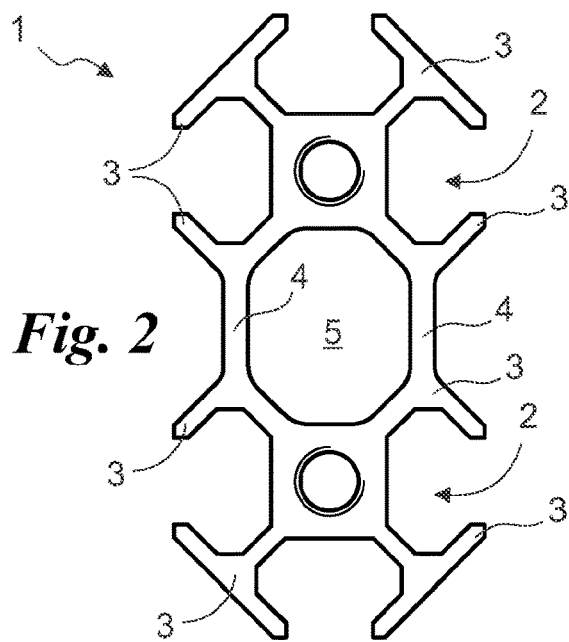
FIG. 2 illustrates a front view of a second embodiment of an extruded profile according to the invention with two cores and with segments having pointed ends.

For example, in a second embodiment shown in FIG. 2, the cores 2 and the junction elements 4 are two in number and the arms 3 are four in number for each of the cores 2.

In addition, the cores 2, junction elements 4 and arms 3, in particular those interconnected via junction elements 4, define a separator 5.

The separator 5 is substantially a closed portion of the normal section surface 10. In this embodiment, the separator 5 is arranged between the cores 2 and defines a substantially hexagonal shape.

In this case too, and except for the portion defining the separator 5, the adjacent arms 3 and the portion of the core 2 between the adjacent arms 3, i.e. included therein, preferably define a substantially octagonal shape accessible at the empty segment defined between the arms 3.

Figure 3:
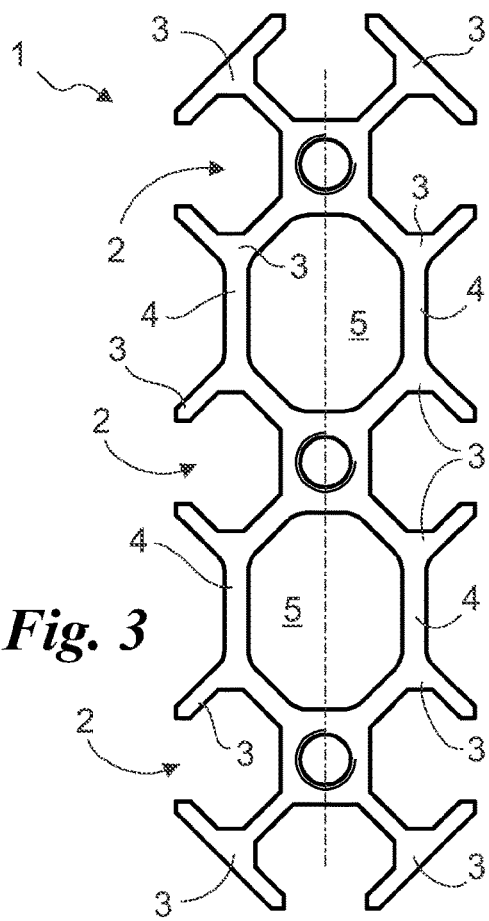
FIG. 3 is a front view of a third embodiment of an extruded profile according to the invention with three aligned cores and with segments having pointed ends.
Figure 8:
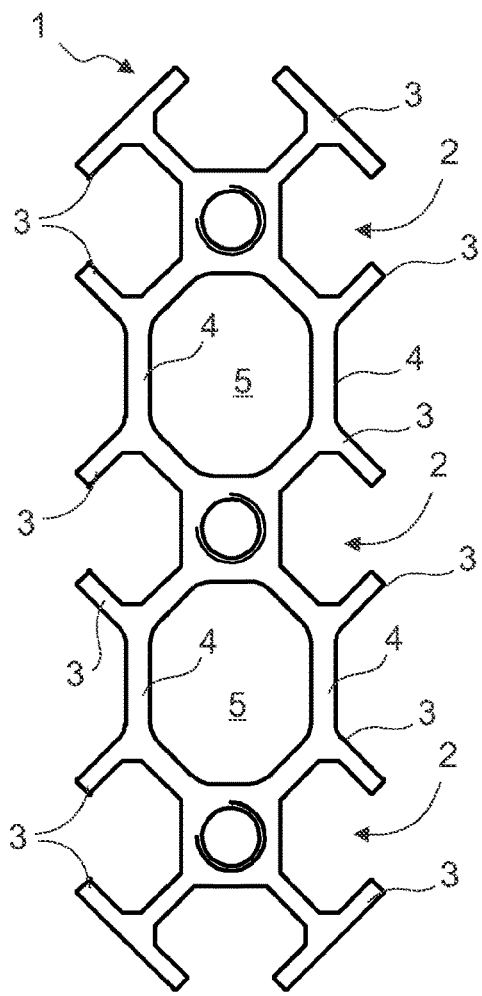
FIG. 8 shows a front view of a sixth embodiment of an extruded profile according to the invention with six cores arranged in a rectangle and with rectangular segments.

In a third embodiment shown in FIGS. 3 and 8, the cores 2 are three in number and aligned along the same direction. Consequently, the junction elements 4 are four in number and the arms 3 are four in number for each of the cores 2.

The cores 2, junction elements 4 and arms 3, interconnected via junction elements 4, define two separators 5.

Both are arranged between the cores 2 and define a substantially hexagonal shape. In this case too, and except for the portions defining the separator 5, the adjacent arms 3 and the portion of the core 2 between the adjacent arms 3, i.e. included therein, preferably define a substantially octagonal shape accessible at the empty segment defined between the arms 3.

Figure 4:
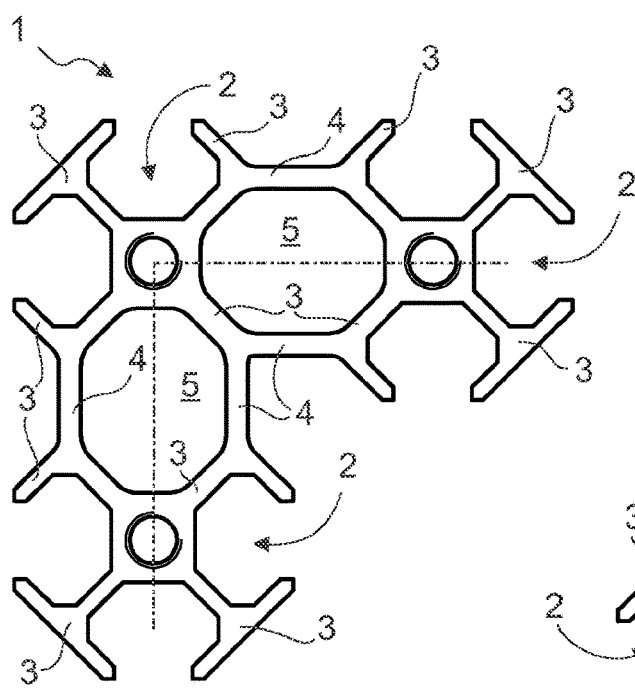
FIG. 4 represents a front view of a fourth embodiment of an extruded profile according to the invention with three cores arranged in an L-shape and with segments having pointed ends.

In a fourth embodiment, shown in FIG. 4, the configuration of the profile 1 is conceptually similar to the third embodiment with the difference that the three cores 2 are arranged in an L instead of being aligned.

The separators 5 are therefore preferably in contact with each other, while the other characteristics have already been described and are in any case visible in FIG. 4.

Figure 5:
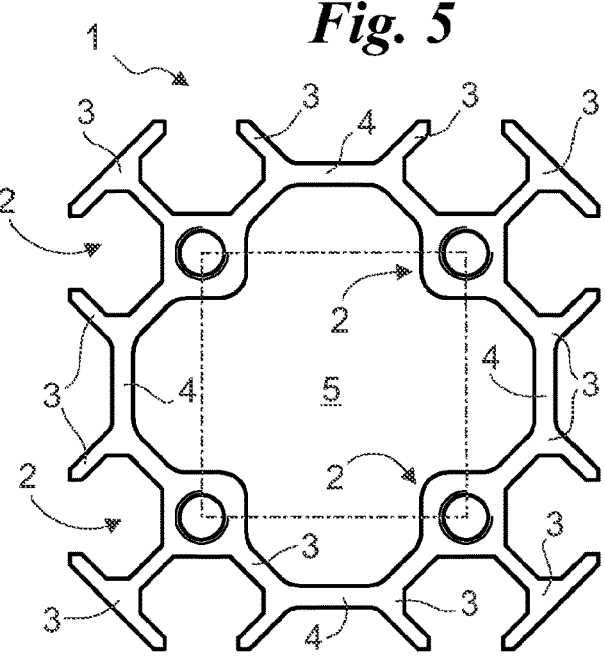
FIG. 5 illustrates a front view of a fifth embodiment of an extruded profile according to the invention with four cores arranged in a square and with segments having pointed ends.

In a fifth embodiment, shown in FIG. 5, the cores 2 are four in number and are arranged in a square. Unlike the preceding configurations, the junction elements 4 are four in number and the arms 3 are three in number for each of the cores 2.

The cores 2, junction elements 4 and arms 3 are interconnected via junction elements 4, so as define a single separator 5.

The latter is delimited by the cores 2, junction elements 4 and arms 3 interconnected by junction elements 4 defining a substantially octagonal shape.

Figure 6:
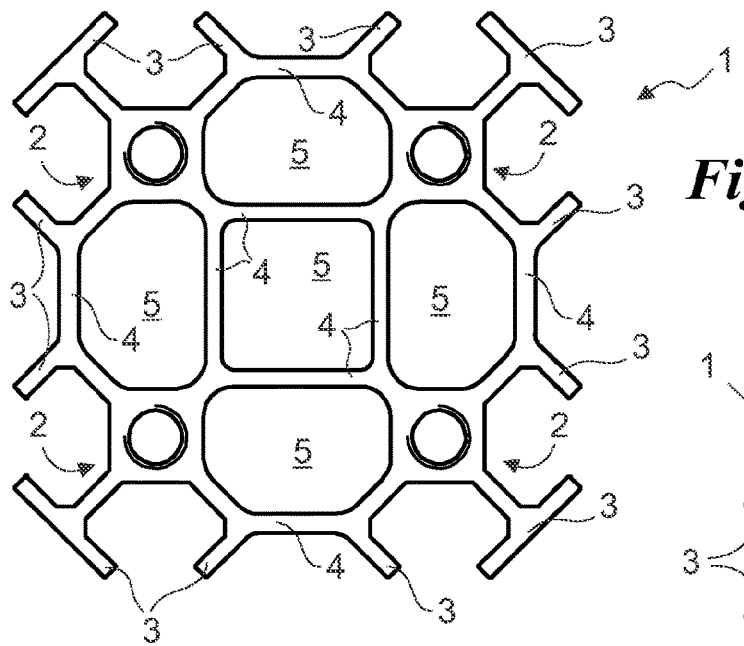
FIG. 6 illustrates a front view of a fifth embodiment of an extruded profile according to the invention with four cores arranged in a square in an alternative version to FIG. 5 and including four additional junction elements and with rectangular segments.

However, the fifth embodiment could also be made in an alternative configuration, as shown in FIG. 6.

In this example, the cores 2 are four in number and arranged in a square, the junction elements 4 are eight in number and the arms 3 are four in number for each of the cores 2.

The cores 2, junction elements 4 and arms 3, interconnected via junction elements 4, define four separators 5.

In addition, the same junction elements 4 in turn create a central separator 5.

Figure 7:
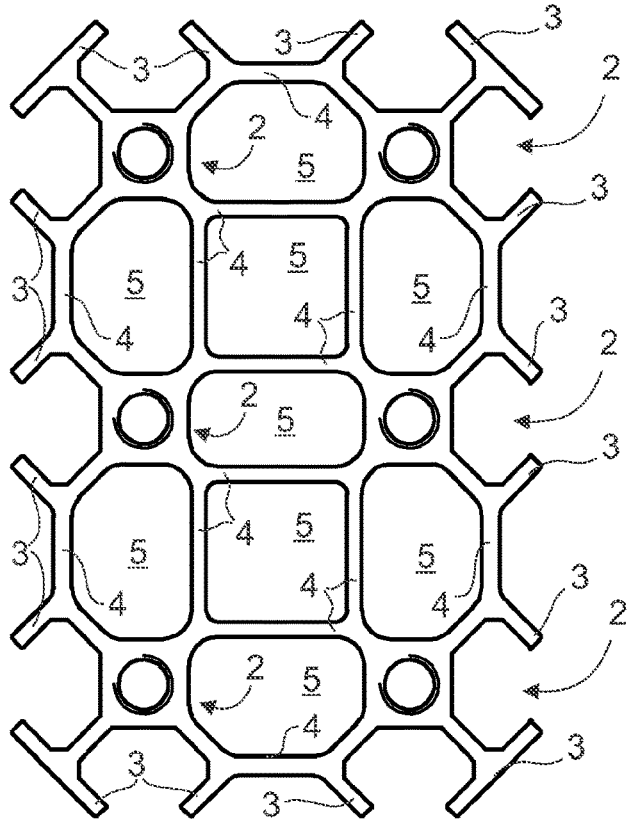
FIG. 7 is a front view of a second embodiment of an extruded profile according to the invention with two cores and with rectangular segments.

In a sixth embodiment, shown in FIG. 7, the cores 2 are six in number and are arranged in a rectangle.

The junction elements 4 are therefore fourteen in number and the arms 3 are four in number for each of the cores 2.

The cores 2, junction elements 4 and arms 3, interconnected via junction elements 4, define seven separators 5.

In addition, the same junction elements 4, four by four, create two central separators 5.

The device 100 comprises at least one support 101 and teeth 102.

Preferably, the support 101 is substantially a plate suitable to be arranged in adhesion to one end of an extruded profile and preferably to the profile 1.

The support 101, therefore, preferably defines a connection surface 11.

The connection surface 11 is flat and is suitable to allow interfacing with an extruded profile.

The connection surface 11 thus also defines a second horizontal load direction 11a and a second vertical load direction 11b.

The second horizontal load direction 11a is preferably arranged along the connection surface 11. Similarly, the second vertical load direction 11b is also arranged along the connection surface 11 and is perpendicular to the second horizontal load direction 11a.

Substantially, the second directions 11a and 11b define a centre for the connection surface 11. Preferably, therefore, the second directions 11a and 11b may coincide with the barycentric axes of the device 100, or with the barycentric axes of part of it. The device 100 comprises, as mentioned, a plurality of teeth 102. The latter protrude from the support 101 preferably perpendicularly to the connection surface 11.

In particular, the teeth 102 and part of the support 101 create at least two grooves 200.

The grooves 200 are preferably cavities delimited by the teeth 102 and by the support 101, which therefore assume a modelled shape compared to the teeth 102 and to the support 101.

Preferably, the grooves 200 are convex. In addition, they extend along the second horizontal load direction 11a and the second vertical load direction 11b respectively. Substantially, therefore, the second load directions 11a and 11b define the directions with respect to which the connection is defined.

Figure 19:
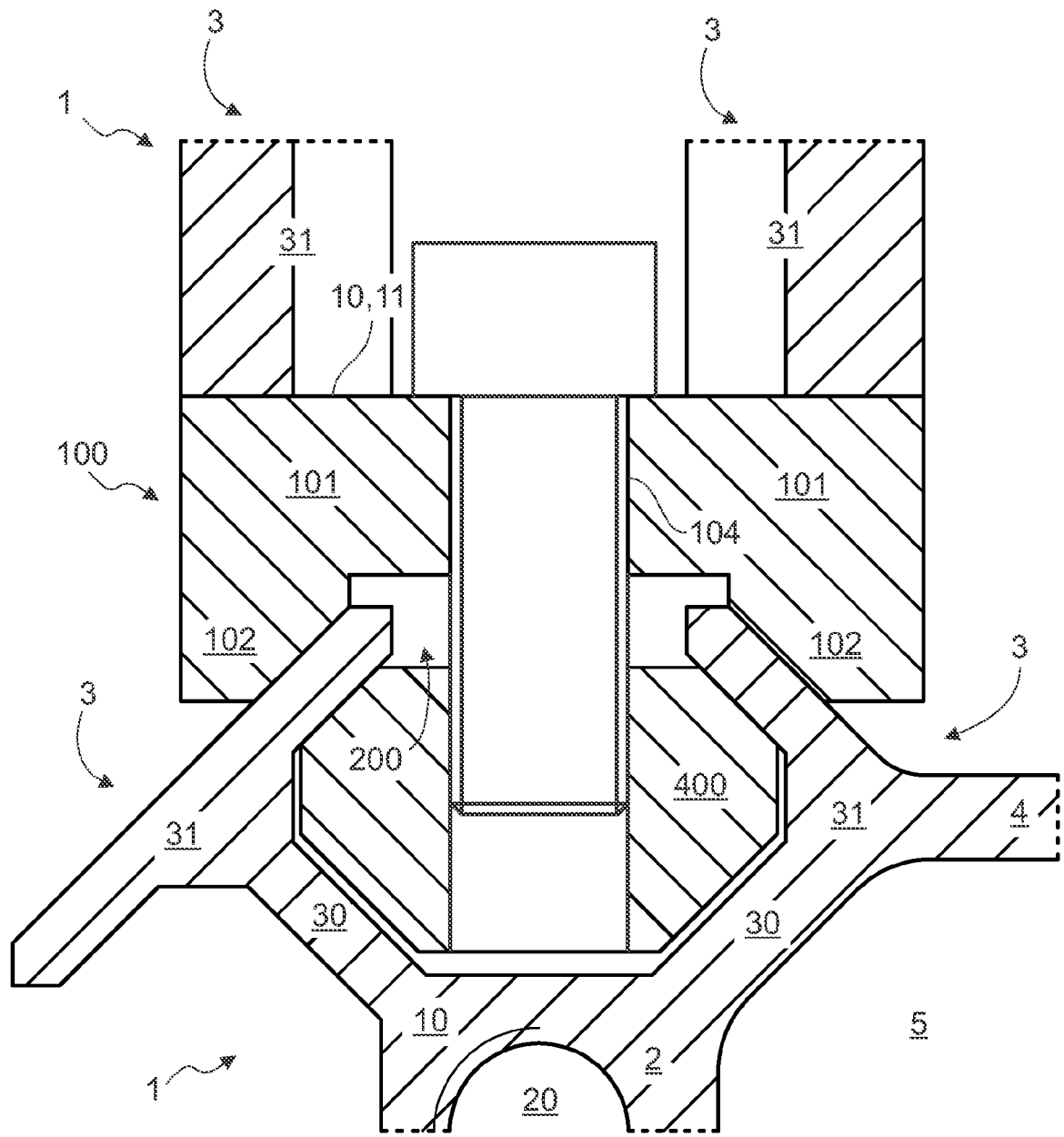
FIG. 19 is a detail of the coupling between extruded profiles according to the invention by means of the joining device according to the invention and including a profile in the second embodiment wherein the device and the profile are mutually connected with screw and nut.
Figure 20:
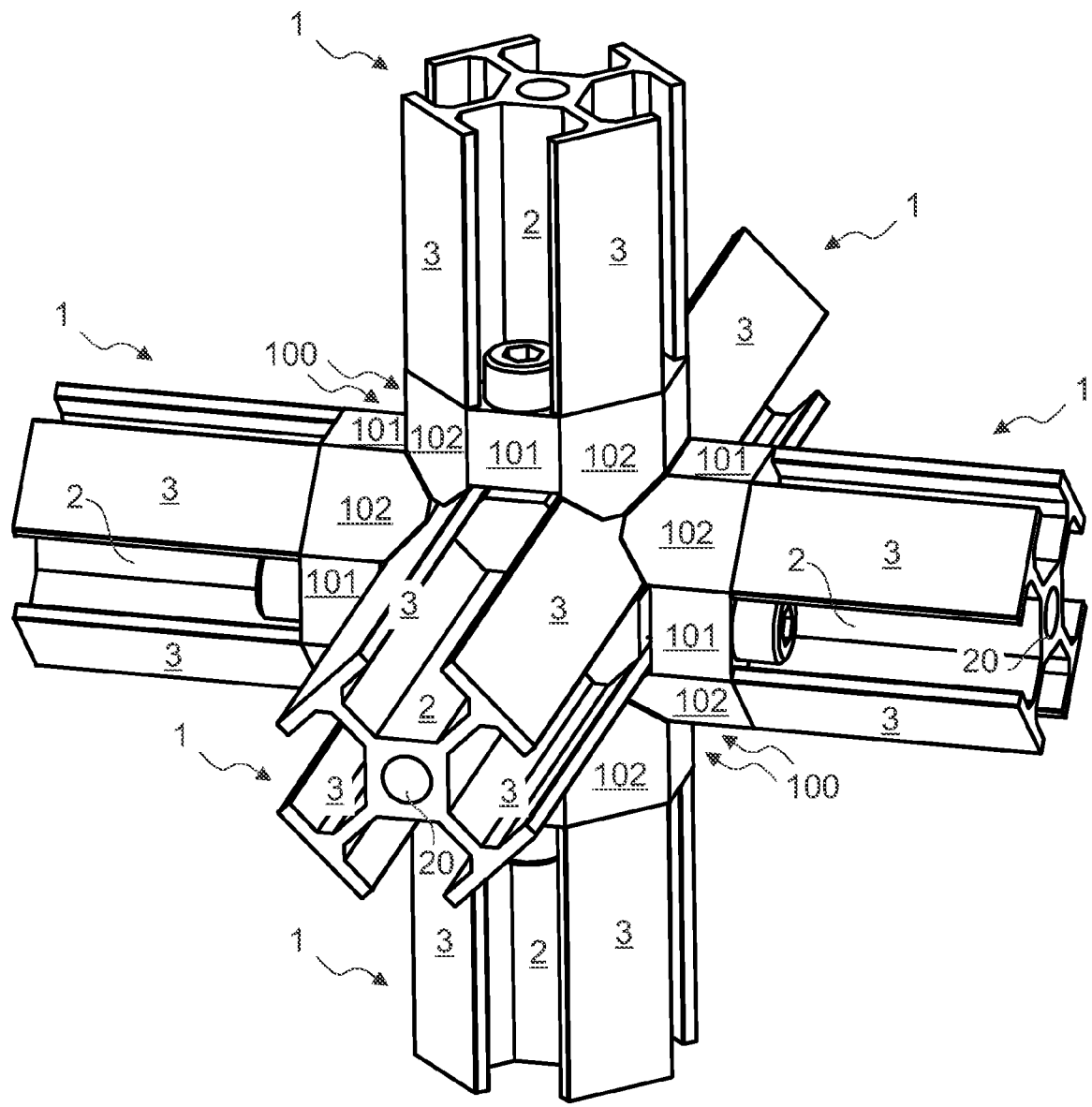
FIG. 20 shows a perspective view of an example of coupling extruded profiles according to the invention by means of a plurality of joining devices according to the invention arranged in such a way as to achieve a three-dimensional intersection.
Figure 21:
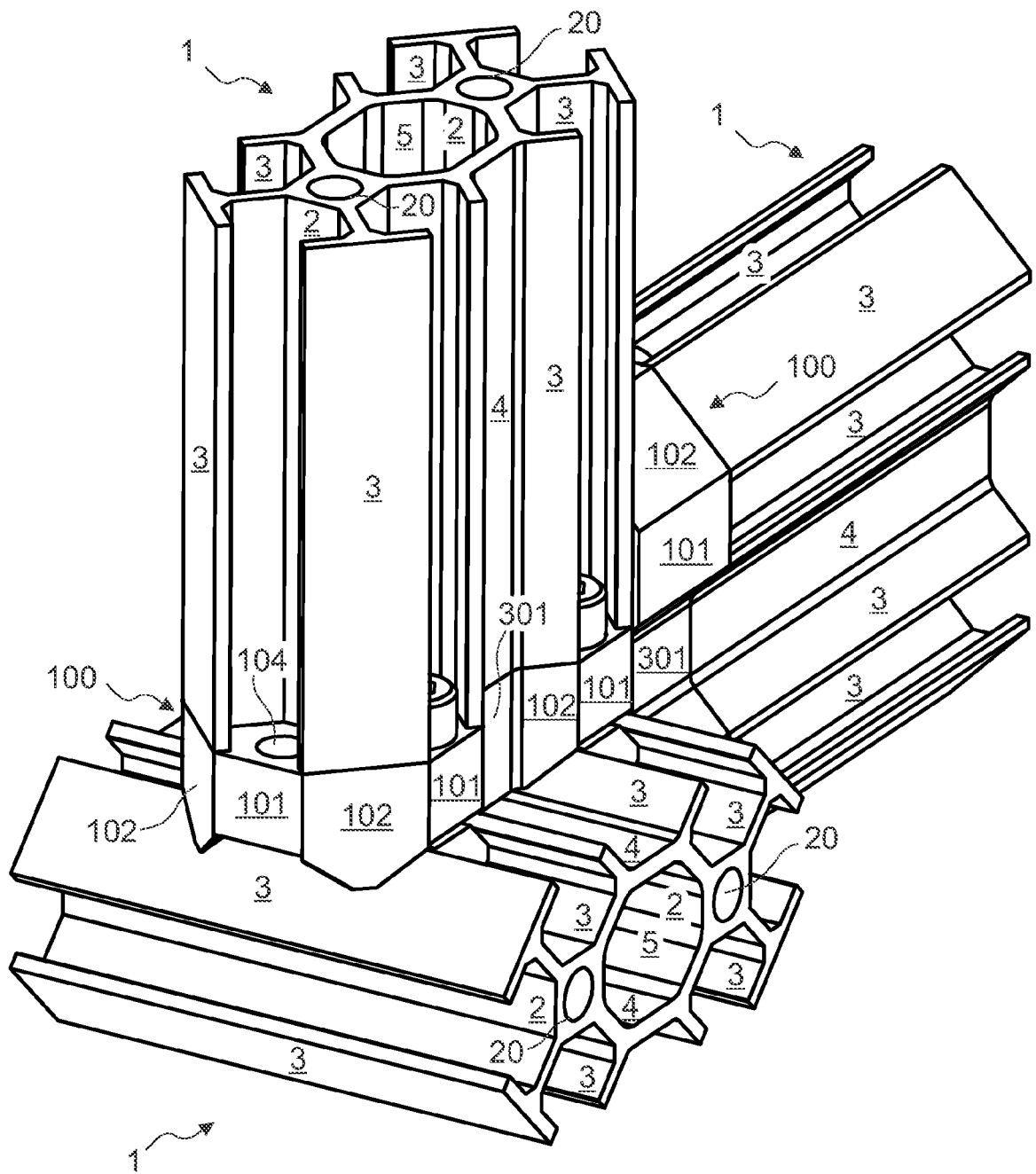
FIG. 21 shows a perspective view of the coupling between extruded profiles in FIG. 16 in which the positions of the locking screws and nuts are also highlighted.

The grooves 200, in detail, each define a section perpendicular to the connection surface 11 of a trapezoidal shape diverging from the support 101 outwards, as shown in FIGS. 10 and 19.

As a result, the teeth 102 may, for example, define a substantially truncated pyramidal shape with a triangular base.

The support 101 can be modelled into various shapes, for example, compatible with the extruded profiles for which it is intended.

Preferably, it defines an octagonal shape along the connection surface 11. In this way, for example, it is more compatible with similar shapes and with the profile 1.

In this embodiment, preferably, the teeth 102 are arranged at non-adjacent sides of the octagonal shape so that the grooves 200 made by the teeth 102 and by the support 101 intersect perpendicularly, as shown in FIG. 9.

More in detail, preferably, the grooves 200 intersect in such a way that the cross is substantially centred with respect to the intersection of the second load directions 11a, 11b.

In other embodiments, the device 100 comprises a plurality of supports 101. For example, as shown in FIGS. 10-11 the supports 101 could be two in number. However, they may also be in greater numbers, as shown in FIGS. 12-15.

The supports 101, in any case, are mutually connected by means of an extension 300.

The extension 300 may be a plate suitable to connect the support 101 or other connection elements, known in the prior art, suitable to connect the parts at a distance.

Preferably, the extension 300 comprises at least two connectors 301.

The connectors 301 are preferably suitable to connect two teeth 102 each arranged on a different support 101. Substantially, the connectors 301 are, for the device 100, conceptually similar to the joining elements 4 of the profile 1.

The connectors 301 can, in fact, be superposed on the said joining elements 4.

In addition to what has already been described, the device 100 comprises a connection opening 103.

The connection opening 103 is preferably arranged in the centre of the support 101, consequently, it is preferably arranged at the intersection of the second directions 11a, 11b.

In particular, the connection opening 103 is suitable to allow the connection of the device 100 to other external elements. The external elements may be extruded profiles of any shape and, preferably, the profile 1.

The connection opening 103 is, preferably, a threaded hole into which a screw can be inserted. In this respect, the connection opening 103 could also be of a size compatible with the connection hole 20.

As already mentioned, the device 100 and the profile 1 can be connected to each other in such a way as to create a structural bar. To make the bar, preferably the device 100 and the extruded profile 1 are connected to each other in such a way that the normal section surface 10 and the connection surface 11 are opposite each other and the horizontal 1a and vertical 1b load directions are respectively aligned with the second horizontal 11a and vertical 11b load directions.

In addition, in particular, the profile 1 and the device 100 are connected by conventional means of attachment, such as screws, which are partially arranged inside the connection hole 20 and the connection opening 103 and compatible therewith.

The design of the device 100 makes it possible to use a device 100 with single support 101 also for profiles 1 according to multi-core 2 embodiments.

In fact, for example, it is possible to make a structural bar, according to the invention, either with a device 100 with double support 101, shown in FIGS. 10-11, and a double core profile 2, shown in FIG. 2, or with two single support devices 100, shown in FIG. 9, mounted on the double core 2 profile 1 in such a way that the supports 101 are respectively centred with the cores 2.

The same applies to the profiles 1 according to the embodiments shown in FIGS. 3-8.

Figure 13:
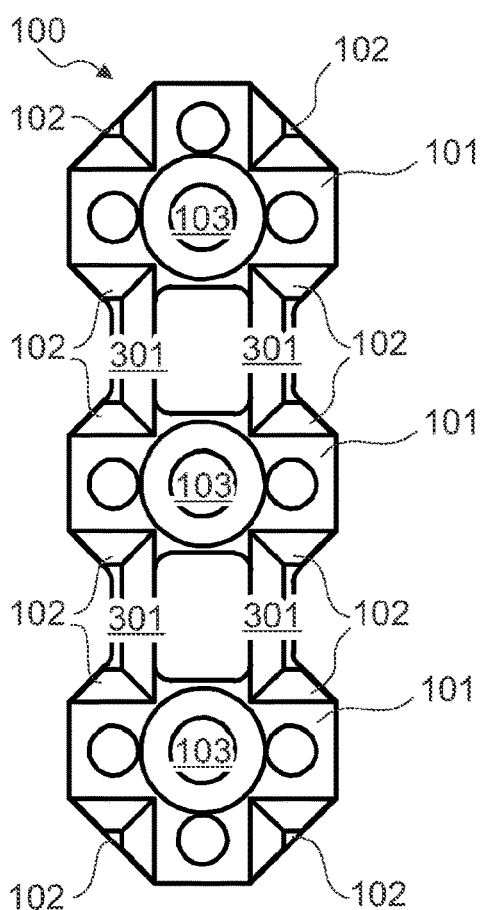
FIG. 13 shows a front view of a joining device for extruded profiles according to the invention in a second example for triple-core profiles wherein the cores are aligned, for example as shown in FIGS. 3 and 8.

For example, for the profiles 1 of FIGS. 3 and 8 three individual devices 100, can be used, as shown in FIG. 9, or the device 100 in FIG. 13.

Figure 12:
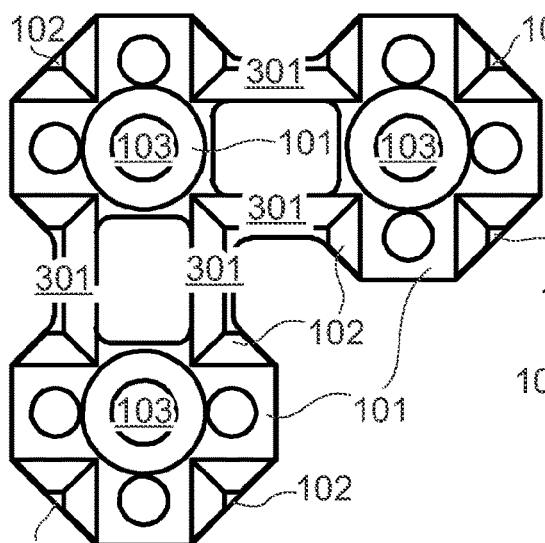
FIG. 12 shows a front view of a joining device for extruded profiles according to the invention in a second embodiment example for triple-core profiles wherein the cores are arranged in an L shape, for example as shown in FIG. 4.

Likewise, for the profile 1 of FIG. 4, three individual devices 100, can be used, as shown in FIG. 9, or the device 100 in FIG. 12.

Figure 14:
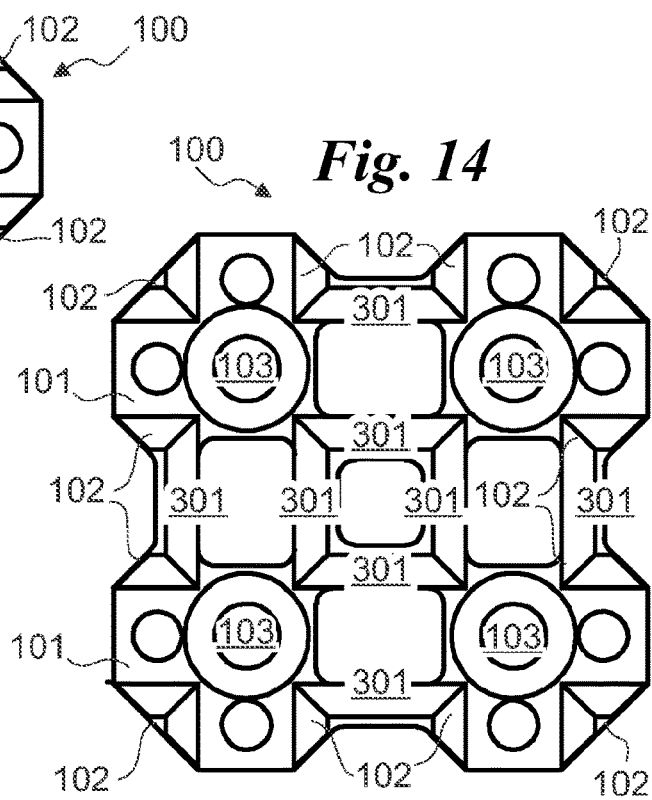
FIG. 14 shows a front view of a joining device for extruded profiles according to the invention in a second embodiment example for four-core profiles, for example as shown in FIGS. 5-6.

For the profiles 1 of FIGS. 5-6, four individual devices 100, can be used, as shown in FIG. 9, or the device 100 in FIG. 14.

Figure 15:
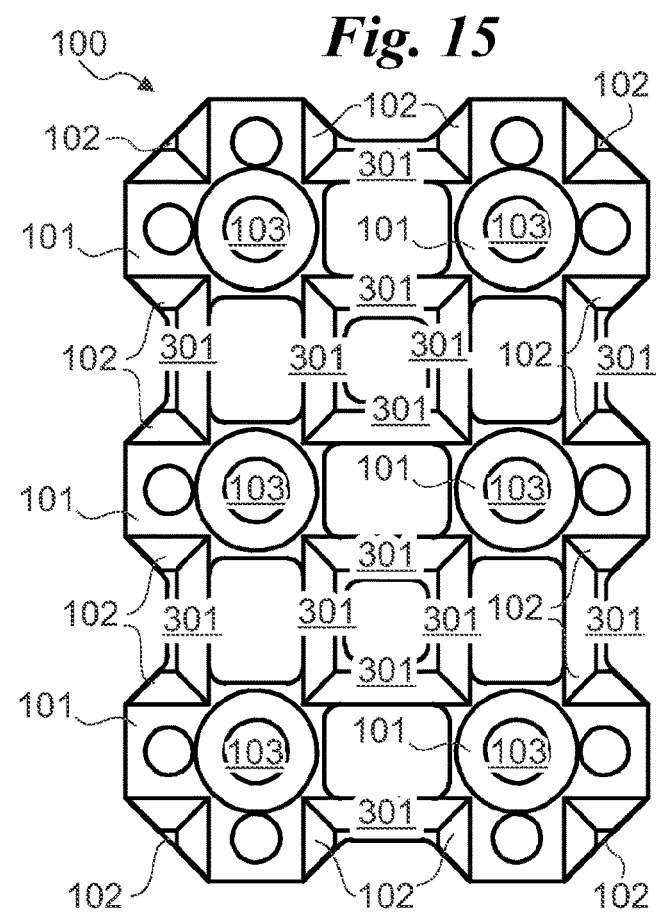
FIG. 15 is a front view of a joining device for extruded profiles according to the invention in a second embodiment example for six-core profiles, for example as shown in FIG. 7.
Figure 16:
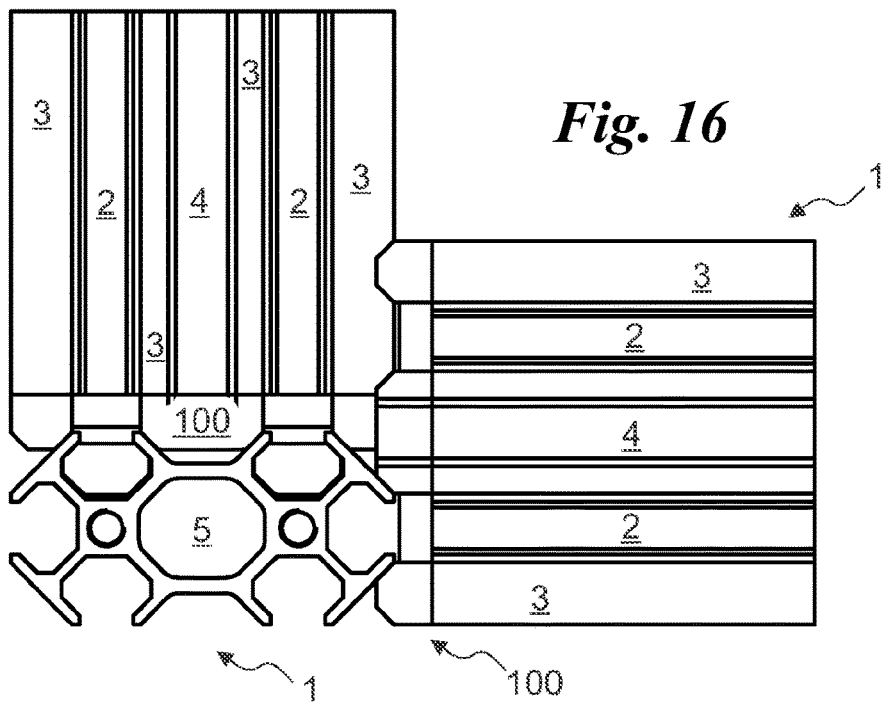
FIG. 16 shows a side view of an example of coupling three extruded profiles according to the invention by means of joining devices according to the invention in a substantially ordered triple.
Figure 17:
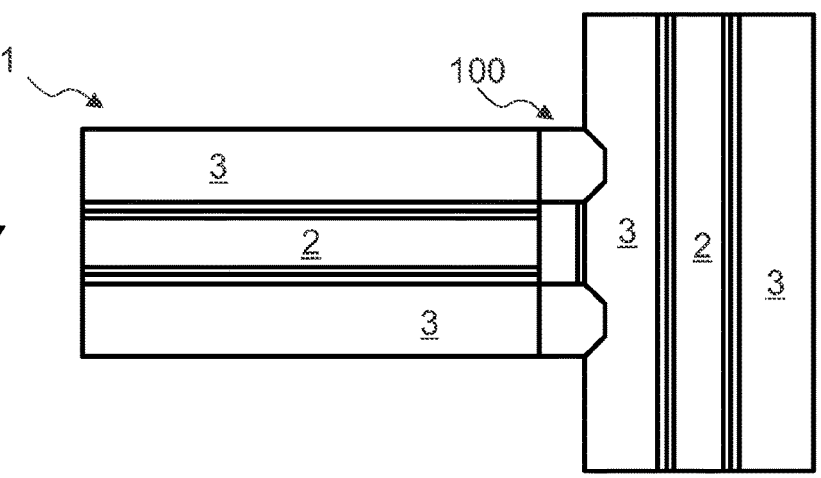
FIG. 17 shows an example of coupling two extruded profiles according to the invention by means of a joining device according to the invention in a substantially T configuration.
Figure 18:
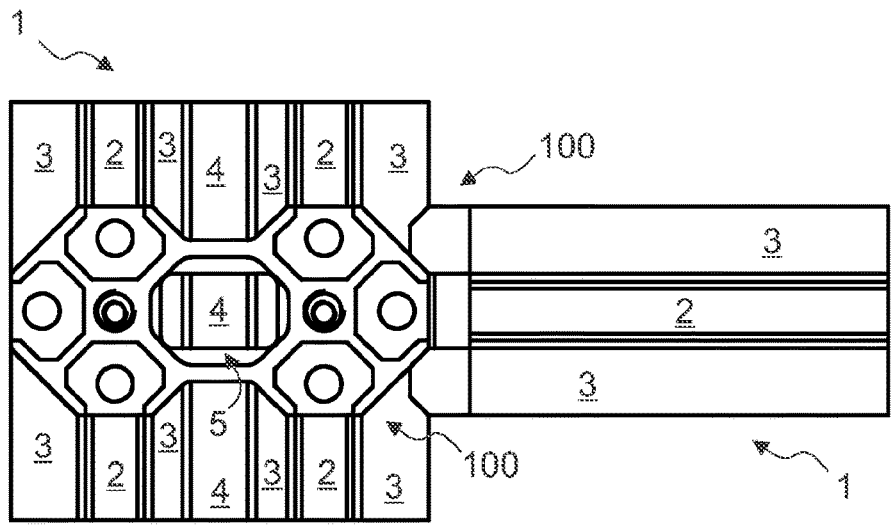
FIG. 18 illustrates a view from above of the example of coupling in FIG. 16.

Or, for the profile in FIG. 7, six individual devices 100, can be used, as shown in FIG. 9, or the device 100 in FIG. 15.

The device 100, lastly, also includes at least one coupling cavity 104 for each of the grooves 200.

In particular, the coupling cavity 104 may have the same characteristics as the connection hole 20 and/or the connection opening 103. The coupling cavity 104 is, in fact, suitable to allow the connection of the device with external elements.

Preferably, the coupling cavity 104 is arranged in a decentralized position inside the device 100 and preferably in proximity of the outer perimeter thereof.

However, among the external elements, there is preferably a nut 400.

The nut 400 may be a conventional nut, known in the prior art, and already used in the industry to connect profiles to joining elements.

Preferably, the nut 400 is, in this case, available inside the space between adjacent arms 3 which substantially form a guide for the nut 400. For example, if the arms 3 and core 2 define an octagonal shape, the nut 400 may also be octagonal or, in any case, be compatible with the shape of the cavity.

The nut 400 may thus be in one piece, as known, or it may assume an advantageous configuration.

The nut 400 can, in fact, preferably be disassembled and includes a locking base 401 and a locking cover 402.

The locking base 401 is preferably the portion of the nut suitable to adhere to the core 2 of the profile 1. Consequently, preferably, the locking base 401 is substantially at least counter-shaped to the portion of profile 1 defined by the radial segments 30 of two adjacent arms 3 and to the portion of core 2 enclosed by said radial segments 30, as shown in FIG. 22a.

The locking cover 402, is instead preferably suitable to adhere to at least part of the tangential segments 31 of the adjacent arms 3 of the profile, as shown in FIG. 22b, and is accessible from the empty segment of the profile 1.

Preferably, the locking base 401 and the cover 402 are two complementary elements configured to make the nut 400. They are at least mutually counter-shaped, but they may also be interlocking elements.

More in detail, and as shown in FIGS. 22a-22b, the nut 400 has a substantially octagonal profile and therefore the locking base 401 and the locking cover 402 define profiles that are fragments of the octagonal profile of the assembled nut 400.

Preferably, the locking cover 402 includes two straight sections arranged along the perimeter portion of the octagonal profile and extending at two adjacent sides of the octagon. The locking base 401 corresponds to the remaining portion of the profile. In this way, it is possible to insert the nuts 400 inside the guide defined by the adjacent arms 3 of the profiles 1 even when the extruded profiles 1 are not accessible from their ends, for example because they are assembled on both sides with joining devices 100 to create a structural bar.

In particular, the procedure for the insertion of the nuts 400 envisages a first insertion phase, a second insertion phase and an assembly phase. These phases are highlighted, in sequence, in FIG. 23.

In the first insertion phase, the locking base 401 is inserted askew between two adjacent arms 3 so that it can pass through the empty segment.

In addition, the locking base 401, once placed in the guide, is rested on the core 2 so that it is substantially counter-shaped to the radial segments 30 and the portion of the core included therein.

In the second insertion phase, the locking cover 402 is inserted in the guide made by said adjacent arms 3 but spaced from the locking base 401 along the prevailing extension axis of the extruded profile 1.

The locking cover 402 is also inserted askew and then straightened so that it is counter-shaped to at least part of the tangential segments 31 of the adjacent arms 3.

In the assembly phase, in conclusion, the locking cover 402 is made to slide on the locking base 401 in such a way as to form a real nut 400.

Subsequently, the locking base 401 and the locking cover 402 are secured using the locking screws used for coupling with another profile 1.

The invention also makes it possible to make frames.

A frame is understood as a structure inside which the profiles 1 are ordinate and mutually connected by means of joining means or intersections, preferably by means of devices 100.

As a result, the frame includes at least one structural bar and an extruded profile 1 wherein the tangential segments 31 of the adjacent arms 3 create a substantially trapezoidal shape counter-shaped to the groove 200.

In this way, the extruded profile 1 is arranged in contact with the device 100 of the structural bar so that the tangential segments 31 rest on the teeth 102.

In addition, the extruded profile 1 and the structural bar are secured to each other by conventional coupling means, e.g. screws, which are partially arranged inside the coupling cavity 104 and connected to the nut 400.

In particular, preferably the coupling cavity(ies) 104 are configured in such a way that each allows access to the space and to the spaces between the adjacent arms 3 of the profile 1. In this way, access to the cavities 104 can be performed using the guides defined by the adjacent arms 3 inside the extruded profile 1 wherein, inside each, the nut 400 can be housed.

Substantially, therefore, when the profile 1 and the device 100 are connected to each other, the coupling cavity 104 faces the space between two adjacent arms 3.

The nut 400 may therefore also conventionally have a hole for the arrangement of the screw inside it.

The operation of the profile 1 described above in structural terms is evident from the preceding description and, in any case, similar to what has already been envisaged for the construction of the frames.

The invention comprises a new use of an extruded profile 1 defining a normal section surface 10 and a substantially octagonal perimeter defined by tangential segments 31 and alternating empty segments to support at least a load C.

In particular, the novelty of use lies in the fact that the profile 1 is used in such a way that the load C is oriented perpendicularly to at least one of the empty segments.

This new method of use allows the shear load to be transmitted and differs from all profiles of the prior art that work under normal or perpendicular loads to the tangential segments 31.

The profile 1 according to the invention achieves important advantages.

In fact, the extruded profile 1 allows different types of couplings to be made, compared to known profiles, and loads to be distributed differently, as has been pointed out several times.

By distributing the loads, it is possible to reduce the characteristic thicknesses of the arms 3 and simplify the structural shape of the profile 1 itself.

As a result, a further advantage of profile 1 is that it is easy to machine and to make. In conclusion, a further advantage is that the geometrical conformation of the profile 1, and in particular of the arms 3, makes it possible to create octagonal cavities between adjacent arms 3 such that the nuts can be inserted starting from the empty segment.

Usually, in fact, in the profiles of the prior art it is necessary to insert the nuts, sliding, in the correct number before connecting the profile itself. Instead, the shape of the guide made by the profiles 1 allows the nuts 400 or other compatible nuts to be inserted, even when the profile 1 has been connected to a device 100, for example to make a structural bar and thus a connection.

Variations may be made to the invention described herein without departing from the scope of the inventive concept defined in the claims.

For example, the device 100 could be in one piece and/or part of the profile 1 itself. In this regard, the teeth 102 may correspond to portions of arms 3 cut in such a way that the core forms the support 101.

In said sphere all the details may be replaced with equivalent elements and the materials, shapes and dimensions may be as desired.

This description may be considered as a basis for the claim, alternative to the subject of this application, of the following:

1. Joining device (100) for extruded profiles comprising a support (101) defining a flat connection surface (11) suitable to allow the interface with an extruded profile, a second horizontal load direction (11a) along said connection surface (11) and a second vertical load direction (11b) along said connection surface (11) perpendicular to said second horizontal load direction (11a) and said device (100) comprising a plurality of teeth (102) protruding from said support (101) perpendicularly to said connection surface (11), and being characterised in that said teeth (102) and part of said support (101) form at least two convex grooves (200) extending respectively along said second horizontal load direction (11a) and along said second vertical load direction (11b).

2. The device (100) according to claim 1, wherein each of said grooves (200) defines a section perpendicular to said connection surface (11) of a trapezoidal shape diverging from said support (101) outwards.

3. The device (100) according to at least one preceding claim, wherein said support (101) defines an octagonal shape along said connection surface (11) and said teeth (102) are arranged at non-adjacent sides of said octagonal shape in such a way that said grooves (200) made by said teeth (102) and said support (101) intersect perpendicularly.

4. The device (100) according to at least claim 1 comprising a plurality of said supports (101) and said supports (101) are connected to each other by an extension (300), said extension (300) including at least two connectors (301) suitable to connect two teeth (102) each arranged on a different support (101).

5. The device (100) according to at least claim 1 comprising at least one connecting opening (103) placed at the centre of said support (101) and suitable to allow the joining between said device (100) and other external elements.

6. The device (100) according to at least claim 1 comprising at least one coupling cavity (104) for each of said grooves (200) suitable for allowing the connection of said device to at least one external element.

7. A structural bar comprising at least one device (100) according to at least one claim and one extruded profile defining a normal section surface (10), a horizontal loading direction (1a) along said a normal section surface (10) and a vertical loading direction (1b) along said a normal section surface (10) perpendicular to said horizontal loading direction (1a), wherein said profile (1) comprises a core (2) arranged in a central position at the intersection of said directions (1a, 1b), a plurality of arms (3) each comprising a radial segment (30) radially connected to said core (2) and a tangential segment (31) perpendicularly connected to said radial segment (30), wherein said radial segments (30) of said adjacent arms (3) are mutually perpendicular and each oriented 45° to said horizontal load direction (1a) and/or said vertical load direction (1b), and said tangential segments (31) of said adjacent arms (3) being configured to simultaneously support the same load (C) along said horizontal load direction (1a) and/or said vertical load direction (1b), said device (100) and said extruded profile (1) being connected to each other in such a way that said normal section surface (10) and said connection surface (11) are opposite each other and the horizontal (1a) and vertical (1b) load directions are respectively aligned with the second horizontal (11a) and vertical (11b) load directions.

8. The structural bar according to at least claim 7, wherein said profile (1) includes a connection hole (20) which allows the connection with other elements and said device (100) and said profile (1) are connected by conventional coupling means arranged partially inside said connection hole (20) and said connection opening (103) and compatible therewith.

9. A frame including a structural bar and at least one extruded profile (1) of at least claim 7, wherein said tangential segments (31) of said adjacent arms (3) create a substantially trapezoidal shape counter-shaped to said groove (200) and said extruded profile (1) is placed in contact with said device (100) of said structural bar in such a way that said tangential segments (31) rest on said teeth (102).

10. The frame according to at least claim 9, comprising a nut (400) available inside the space between said adjacent arms (3) and wherein said extruded profile (1) and said structural bar are reciprocally blocked by conventional coupling means arranged partially inside said coupling cavity (104) and connected to said nut (400) said coupling cavity (104) being configured in such a way as to allow access to the space between at least two adjacent arms (3) of said profile (1).

The invention claimed is:

1. A structural bar including:
   an extruded profile defining a normal section surface, a horizontal loading direction along said normal section surface and a vertical loading direction along said normal section surface perpendicular to said horizontal loading direction, and said profile comprising:
   a core arranged in a central position at an intersection of said directions,
   a plurality of arms each including:
      a radial segment radially connected to said core and extending along a first direction, and
      a tangential segment perpendicularly connected to said radial segment which has a linear profile and extends in a second direction orthogonal to the first direction;
   a joining device comprising:
      a support defining a flat connection surface suitable to allow an interface with said extruded profile, a second horizontal load direction along said flat connection surface and a second vertical load direction along said flat connection surface perpendicular to said second horizontal load direction, and
      a plurality of teeth protruding from said support perpendicularly to said flat connection surface;
   wherein each said radial segment of adjacent said arms is perpendicular to said radial segment of each other of said adjacent arms and each radial segment is oriented at 45° with respect to the horizontal load direction and the vertical load direction,
   wherein each said tangential segment of said adjacent arms is configured, when a load is applied on the extruded profile along said horizontal load direction and/or said vertical load direction, to simultaneously support the load to distribute the stress resulting from the load as a shear stress;
   wherein said teeth form with part of said support at least two convex grooves extending respectively along said second horizontal load direction and along said second vertical load direction, and
   wherein said joining device and said extruded profile are connected to each other in such a way that said normal section surface and said connection surface are opposite each other and the horizontal and vertical load directions are respectively aligned with the second horizontal and vertical load directions.

2. The structural bar according to claim 1, comprising four of said arms and wherein each of said arms creates a T-structure by means of said radial segments and said tangential segments.

3. The structural bar according to claim 1, comprising a plurality of said cores and a plurality of junction elements connecting two distinct arms of said plurality of arms each connected to a distinct core of said cores starting from a respective end of the distinct arm spaced from said distinct core.

4. The structural bar according to claim 3, wherein said cores and said junction elements are two in number and said arms are four in number for each of said cores, and wherein said cores, said junction elements and said arms interconnected by said junction elements define a separator placed between said cores and define a substantially hexagonal shape.

5. The structural bar according to claim 3, wherein said cores are three in number and aligned along a same direction, said junction elements are four in number and said arms are four in number for each of said cores, and wherein said cores, said junction elements and said arms interconnected by said junction elements define two separators arranged between said cores and define a substantially hexagonal shape.

6. The structural bar according to claim 3, in which said cores are three in number and arranged in an L, said junction elements are four in number and said arms are four in number for each of said cores, and wherein said cores, said junction elements and said arms interconnected by said junction elements define two separators arranged between said cores and define a substantially hexagonal shape.

7. The structural bar according to claim 3, wherein said cores are four in number and arranged in a square, said junction elements are four in number and said arms are three in number for each of said cores, and wherein said cores, said junction elements and said arms interconnected by said junction elements defining a separator delimited by said cores, wherein said junction elements and said arms are interconnected by said junction elements and define a substantially octagonal shape.

8. The structural bar according to claim 1, wherein said core defines a substantially square shape defining four vertices, said arms are connected to said core starting from at least part of the vertices of said square shape and said core includes a connection hole suitable to allow connection with other elements.

9. The structural bar according to claim 1, wherein adjacent arms of said plurality of arms and the portion of said core between said adjacent arms define a substantially octagonal shape accessible at empty segments defined between said arms.

10. A structural bar including:
   an extruded profile defining a normal section surface, a horizontal loading direction along said normal section surface and a vertical loading direction along said normal section surface perpendicular to said horizontal loading direction, and said profile comprising:
   a core arranged in a central position at an intersection of said directions, a plurality of arms each including:
  a radial segment radially connected to said core, and
  a tangential segment perpendicularly connected to said radial segment; and
a joining device comprising:
  a support defining a flat connection surface suitable to allow an interface with said extruded profile, a second horizontal load direction along said flat connection surface and a second vertical load direction along said flat connection surface perpendicular to said second horizontal load direction, and
  a plurality of teeth protruding from said support perpendicularly to said flat connection surface;
wherein each said radial segment of adjacent said arms is perpendicular to said radial segment of each other of said adjacent arms and each radial segment is oriented at 45° with respect to the horizontal load direction and the vertical load direction,
wherein each said tangential segment of said adjacent arms is configured, when a load is applied on the extruded profile along said horizontal load direction and/or said vertical load direction, to simultaneously support the load to distribute the stress resulting from the load as a shear stress;
wherein said teeth form with part of said support at least two convex grooves extending respectively along said second horizontal load direction and along said second vertical load direction, and
wherein said joining device and said extruded profile are connected to each other in such a way that said normal section surface and said connection surface are opposite each other and the horizontal and vertical load directions are respectively aligned with the second horizontal and vertical load directions,
wherein each of said grooves defines a section perpendicular to said connection surface of a trapezoidal shape diverging from said support outwards.

11. A structural bar including:
an extruded profile defining a normal section surface, a horizontal loading direction along said normal section surface and a vertical loading direction along said normal section surface perpendicular to said horizontal loading direction, and said profile comprising:
a core arranged in a central position at an intersection of said directions,
a plurality of arms each including:
  a radial segment radially connected to said core, and
  a tangential segment perpendicularly connected to said radial segment; and
a joining device comprising:
  a support defining a flat connection surface suitable to allow an interface with said extruded profile, a second horizontal load direction along said flat connection surface and a second vertical load direction along said flat connection surface perpendicular to said second horizontal load direction, and
  a plurality of teeth protruding from said support perpendicularly to said flat connection surface;
wherein each said radial segment of adjacent said arms is perpendicular to said radial segment of each other of said adjacent arms and each radial segment is oriented at 45° with respect to the horizontal load direction and the vertical load direction,
wherein each said tangential segment of said adjacent arms is configured, when a load is applied on the extruded profile along said horizontal load direction and/or said vertical load direction, to simultaneously support the load to distribute the stress resulting from the load as a shear stress;
wherein said teeth form with part of said support at least two convex grooves extending respectively along said second horizontal load direction and along said second vertical load direction, and
wherein said joining device and said extruded profile are connected to each other in such a way that said normal section surface and said connection surface are opposite each other and the horizontal and vertical load directions are respectively aligned with the second horizontal and vertical load directions,
wherein said support defines an octagonal shape along said connection surface and said teeth are arranged at non-adjacent sides of said octagonal shape in such a way that said grooves made by said teeth and said support intersect perpendicularly each other.

12. A structural bar including:
an extruded profile defining a normal section surface, a horizontal loading direction along said normal section surface and a vertical loading direction along said normal section surface perpendicular to said horizontal loading direction, and said profile comprising:
a core arranged in a central position at an intersection of said directions,
a plurality of arms each including:
  a radial segment radially connected to said core, and
  a tangential segment perpendicularly connected to said radial segment; and
a joining device comprising:
  a support defining a flat connection surface suitable to allow an interface with said extruded profile, a second horizontal load direction along said flat connection surface and a second vertical load direction along said flat connection surface perpendicular to said second horizontal load direction, and
  a plurality of teeth protruding from said support perpendicularly to said flat connection surface;
wherein each said radial segment of adjacent said arms is perpendicular to said radial segment of each other of said adjacent arms and each radial segment is oriented at 45° with respect to the horizontal load direction and the vertical load direction,
wherein each said tangential segment of said adjacent arms is configured, when a load is applied on the extruded profile along said horizontal load direction and/or said vertical load direction, to simultaneously support the load to distribute the stress resulting from the load as a shear stress;
wherein said teeth form with part of said support at least two convex grooves extending respectively along said second horizontal load direction and along said second vertical load direction, and
wherein said joining device and said extruded profile are connected to each other in such a way that said normal section surface and said connection surface are opposite each other and the horizontal and vertical load directions are respectively aligned with the second horizontal and vertical load directions,
comprising a plurality of said supports and said supports are connected to each other by an extension, said extension including at least two connectors suitable to connect two teeth each arranged on a different support.

13. A structural bar including:
an extruded profile defining a normal section surface, a horizontal loading direction along said normal section surface and a vertical loading direction along said normal section surface perpendicular to said horizontal loading direction, and said profile comprising:
a core arranged in a central position at an intersection of said directions,
a plurality of arms each including:
   a radial segment radially connected to said core, and
   a tangential segment perpendicularly connected to said radial segment; and
a joining device comprising:
   a support defining a flat connection surface suitable to allow an interface with said extruded profile, a second horizontal load direction along said flat connection surface and a second vertical load direction along said flat connection surface perpendicular to said second horizontal load direction, and
   a plurality of teeth protruding from said support perpendicularly to said flat connection surface;
wherein each said radial segment of adjacent said arms is perpendicular to said radial segment of each other of said adjacent arms and each radial segment is oriented at 45° with respect to the horizontal load direction and the vertical load direction, wherein each said tangential segment of said adjacent arms is configured, when a load is applied on the extruded profile along said horizontal load direction and/or said vertical load direction, to simultaneously support the load to distribute the stress resulting from the load as a shear stress;

wherein said teeth form with part of said support at least two convex grooves extending respectively along said second horizontal load direction and along said second vertical load direction, and wherein said joining device and said extruded profile are connected to each other in such a way that said normal section surface and said connection surface are opposite each other and the horizontal and vertical load directions are respectively aligned with the second horizontal and vertical load directions, comprising at least one connecting opening placed at a centre of said support and suitable to allow joining between said device and said extruded profile.

* * * * *